May 29, 1923.
B. W. MORTON
1,456,817
PLOW ATTACHMENT FOR TRACTORS
Filed Feb. 25, 1922
2 Sheets-Sheet 1
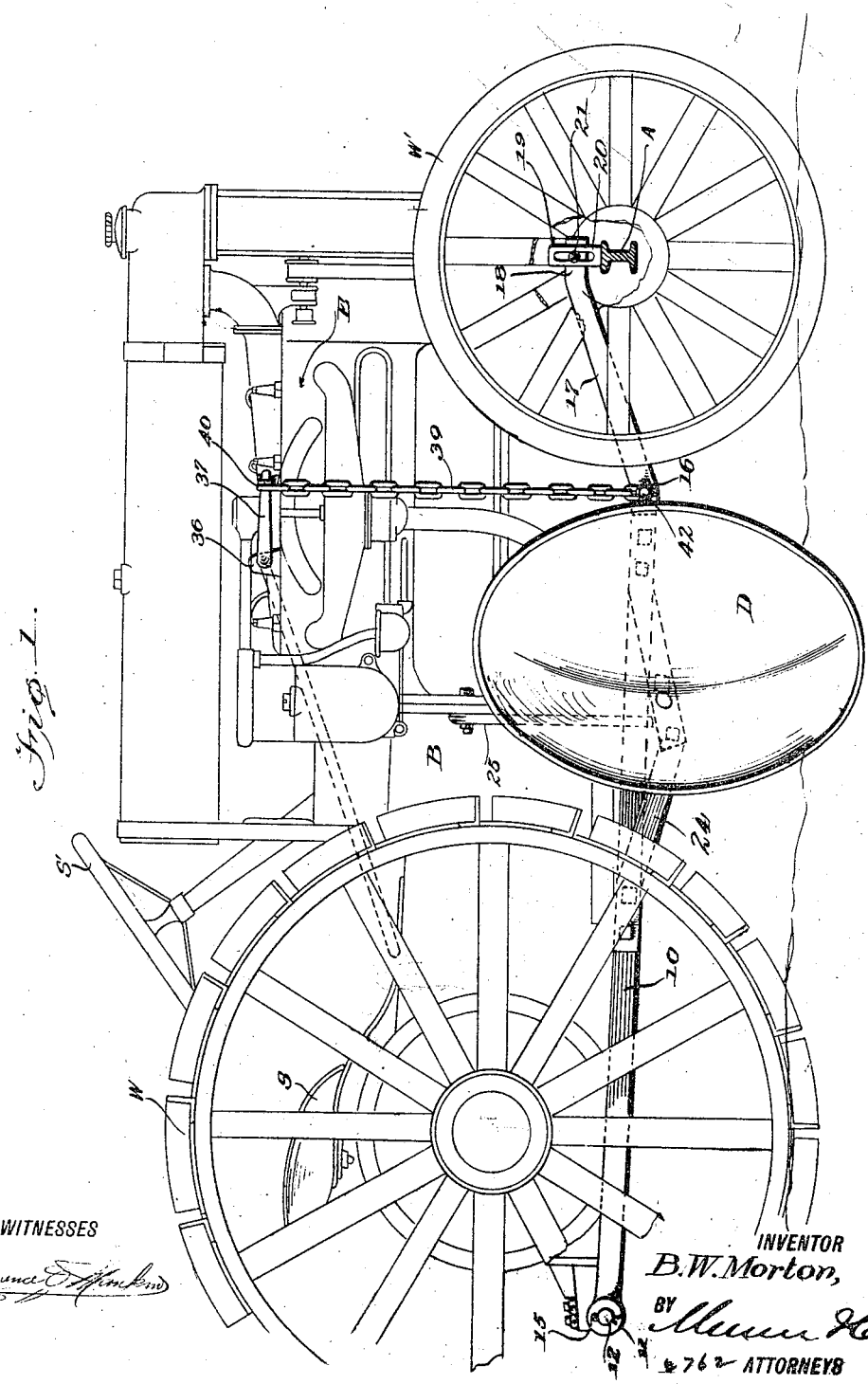

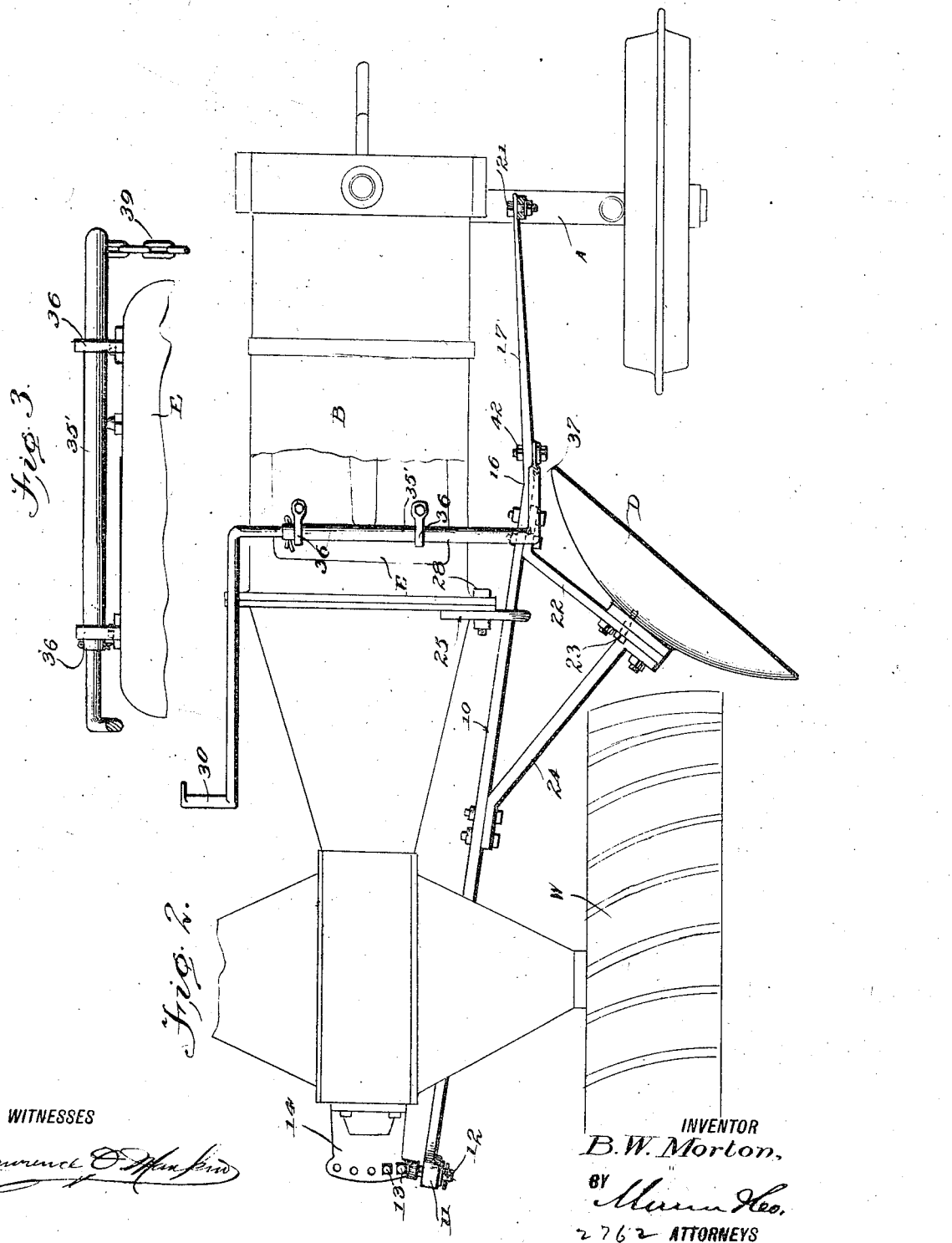

Patented May 29, 1923.

1,456,817

UNITED STATES PATENT OFFICE.

BENJAMIN W. MORTON, OF WILLISTON, FLORIDA.

PLOW ATTACHMENT FOR TRACTORS.

Application filed February 25, 1922. Serial No. 539,252.

*To all whom it may concern:*

Be it known that I, BENJAMIN W. MORTON, a citizen of the United States, and a resident of Williston, in the county of Levy and State of Florida, have invented certain new and useful Improvements in Plow Attachments for Tractors, of which the following is a specification.

This invention relates to a plow attachment for tractors and more particularly to improvements in my invention disclosed in application Serial No. 526,262, filed December 31, 1921. In my application Serial No. 526,262, a plow is shown disposed forward to the seat of the tractor to which the same is attached. The plow is disposed at a point intermediate the forward and rear ends of the tractor with means for attaching the plow to the tractor so that the same will be advanced thereby.

The general object of the present invention is to provide improved means for attaching the plow to a tractor over that shown in my previous application mentioned.

It is also an important object of the invention that means be provided whereby the depth which the plow may penetrate may be positively controlled.

It is a further object of the invention that means be provided whereby the plow may be raised or lowered in an easy and expeditious manner.

Other objects and objects relating to details of construction, combination and arrangement of parts will hereinafter appear in the detailed description to follow.

The invention is illustrated by way of example in the accompanying drawings, in which:—

Figure 1 is a view in side elevation of the tractor showing my invention applied, Figure 2 is a partial top plan view of the same, Figure 3 is a detailed view illustrating the manner in which the foot lever is mounted upon the tractor.

Referring to the drawings more particularly, B indicates generally the body casing of the tractor, W the rear drive wheels, W' the front wheels, and A the front axle. At E is shown the engine associated with the tractor, at S the seat for the operator, and at S' the steering wheel.

In carrying out the present invention, I provide a push bar generally indicated by the reference numeral 10 which is formed at its rear end with an enlarged eye 11 through which there extends a bolt or pin 12, said pin being secured at its inner end by means of bolts 13 to the draw bar 14 of the tractor. The bar 10 is held against displacement from the pin or bolt 12 by a cotter pin 15; and the bar 10 is adapted to extend substantially the entire length of the tractor as shown and from the point 16 continues in the upwardly extending portion 17. It should be observed that the portion 17 slightly extends inwardly with respect to the remainder of the bar 10. The bar portion 17 terminates in a horizontal portion 18 which is adapted to extend over the front axle A. A leg generally indicated by the reference numeral 19 supports the front end of the bar 10 upon the front axle A of the tractor. The leg 19 comprises a plate like member having provided therein an elongated slot 20. The one end of the member 19 rests upon the axle A. Through the end portion 18 of the bar there is extended a bolt 21 which is also extended through the slot 20 of the leg 19 and is adapted to be manipulated for adjusting the height of the forward end of the bar 10 with respect to the axle A.

At the rear of point 16 on the push bar 10 there is secured a plow supporting member 22 which comprises a bar member, as shown, having its greater portion disposed at an angle to the bar 10 and supporting a plow disk D adjacent its outer end, said disk being turnably connected to the bar 22 by an enlarged bolt 23. Between the outer end of the bar 22 and the push bar 10 there extends a brace bar 24, said brace bar being secured to the members mentioned in any preferable manner.

Upon the body casing B of the tractor there is secured a guide bracket 25 which may consist in the plate member having an inner edge corresponding to casing B, and having openings adjacent its inner edge through which the flange bolts of the casing B may extend for securing said guide bracket to the tractor. The outer portion of the guide bracket may be provided with a vertical slot in which the bar 10 is disposed and thereby to serve as a guide for vertical movement of the bar 10. For lowering and raising the plow I provide a suitable foot pedal means which comprises the shaft 35' which is rotatably supported by the members 36. One end of the shaft terminates in a crank arm 29 which in turn terminates in a foot pedal 30. The other end of shaft terminates in a crank arm 37 which is loosely connected at its outer end to an end link of the chain 39. The link 40 may be secured against removal from the outer end of crank arm 37 by a washer and cotter pin as shown in Figure 1.

When it is desired to utilize the present invention, the leg 19 is adjusted with respect to the bar 10 so that the disk D when lowered will cut the desired depth of furrow. By this adjusting means the depth the plow or disk D may penetrate can be accurately controlled. With the forward movement of the tractor the plow is disposed at such an angle that it must rotate and turn a relatively wide strip of land. The size of the disk would of course depend upon the needs of the user. The guide bracket 25 would at all times hold the bar 10 in proper alignment, and also against moving upward beyond a predetermined degree.

The foot pedal lifting means for the plow is particularly valuable when turning the tractor in a field being plowed. By the use of the foot lever the plow may be lifted the desired height in an easy and expeditious manner. The arrangement disclosed in no way interferes with the operation of the plow.

While I have shown my device utilized in connection with a wheel tractor, it is to be understood that I am aware of the fact that the same may be employed with other types with equal advantages with slight modifications of the invention as indicated by the appended claims.

I claim:—

1. In combination with a tractor, a bar extending longitudinally thereof, means for pivotally securing the rear end of said bar to the tractor and the forward end of said bar being adapted to rest upon the front axle of the tractor, and a plow carried by said bar at a point intermediate its ends.

2. In combination with a tractor, a bar extending longitudinally thereof, means for pivotally securing the rear end of said bar to the tractor and the forward end of said bar being adapted to rest upon the front axle of the tractor, a plow carried by said bar at a point intermediate its ends, and adjustable means interposed between the bar and axle whereby the forward end of the bar may be adjusted with respect to said axle.

3. In combination with a tractor, a bar extending longitudinally thereof, means for pivotally securing the rear end of said bar to the tractor and the forward end of said bar being adapted to rest upon the front axle of the tractor, a plow carried by said bar at a point intermediate its ends, and an adjustable support carried by the forward end of the bar adapted to rest upon the axle and serve for adjusting the distance between the forward end of the bar and said axle.

4. In combination, a tractor, a bar extending longitudinally thereof, means for pivotally securing one end of said bar to the tractor for vertical swinging movement of said bar and the forward end of the bar adapted to rest upon a stationary part of said tractor, and a plow supported intermediate the ends of said bar.

5. In combination with a tractor, a bar arranged longitudinally of the tractor and therebeneath, means for pivotally attaching the rear end of said bar to said tractor to permit vertical swinging movement of the bar, an upwardly extending portion formed at the forward end of the bar and adapted to rest upon a stationary part of said tractor, and a plow supported by said bar at a point at the rear of said upwardly extending portion.

6. In combination, a tractor, a bar arranged longitudinally thereof and therebeneath, a pivotal connection between the rear end of said bar and the tractor adapted to permit vertical swinging movement of the bar, said bar at its forward end being adapted to rest upon a stationary part of the tractor, a laterally extending frame supported by the bar at a point intermediate its ends, a plow supported by said frame, said plow being adapted to operate immediately forward to the associated rear wheel of the tractor.

7. In combination, a tractor, a bar arranged longitudinally thereof and therebeneath, a pivotal connection between the rear end of said bar and the tractor adapted to permit vertical swinging movement of the bar, said bar at its forward end being adapted to rest upon a stationary part of the tractor, a laterally extending frame supported by the bar at a point intermediate its ends, a plow supported by said frame, said plow being adapted to operate immediately forward to the associated rear wheel of the tractor, and means interposed between the forward end of the bar and the tractor whereby the last named end of the bar may be vertically adjusted for the purpose described.

8. In combination, a tractor, a bar extending longitudinally thereof, means for pivotally securing one end of said bar to the tractor for vertical swinging movement of said bar and the forward end of the bar adapted to rest upon a stationary part of said tractor, a plow supported intermediate the ends of said bar, and means operable from the tractor whereby the bar may be swung upon its pivot.

9. In combination with a tractor, a bar arranged longitudinally thereof and therebeneath, a pivotal connection between the rear end of the bar and the tractor, an upwardly extending portion formed at the forward end of the bar and adapted to rest at its free end upon the front axle of said tractor, and a plow carried by said bar intermediate the ends thereof.

10. In combination with a tractor, a bar arranged longitudinally thereof and therebeneath, a pivotal connection between the rear end of the bar and the tractor, an upwardly extending portion formed at the forward end of the bar and adapted to rest at its free end upon the front axle of said tractor, and a plow supported by said bar at a point to the rear of said upwardly extending portion, said plow being adapted to operate forward of the associated rear wheel of the tractor.

11. In combination with a tractor, a bar having one end pivotally connected to the tractor, and the other end thereof adapted to rest upon a stationary part of the tractor and having a rearwardly inclined portion occurring intermediate its pivoted end and the forward end, and a plow supported by said rearwardly inclined portion of the bar.

BENJAMIN W. MORTON.